July 30, 1968  P. D. RIGTERINK ET AL  3,394,681
ANIMAL FEEDER CONSTRUCTION

Filed Aug. 8, 1966

INVENTOR.
PRESTON D. RIGTERINK
ROBERT L. VAN HUIS
BY
ATTORNEYS

INVENTOR.
PRESTON D. RIGTERINK
ROBERT L. VAN HUIS

United States Patent Office 3,394,681
Patented July 30, 1968

3,394,681
ANIMAL FEEDER CONSTRUCTION
Preston D. Rigterink, Holland, and Robert L. Van Huis, Zeeland, Mich., assignors to Big Dutchman, Inc., Zeeland, Mich., a corporation of Michigan
Filed Aug. 8, 1966, Ser. No. 570,974
10 Claims. (Cl. 119—52)

ABSTRACT OF THE DISCLOSURE

A support means for a hopper and conveyor trough including vertically oriented tension members connected therewith. The hopper having means for rotatably mounting the same relative to the conveyor trough. Catch means for releasably connecting the hopper with a tension member for maintaining the hopper in an upright operative position or permitting rotation of the hopper to a downward inoperative position whereby the same with the conveyor trough may be elevated a maximum amount above a floor area.

---

This invention relates to animal feeders of the automated type such as include a feed trough having a feed conveyor therein and a feed supply hopper for said trough; more particularly, the invention relates to animal feeding equipment of this type which is suspended from overhead, clear of the underlying floor surface.

Animal feeding equipment of the type comprising feed troughs or lines connected into a supply hopper and suspended as a unit from overhead has been known and used for quite some time, and the advantages of such a system are well appreciated by many persons. Since it hangs above and free from the underlying floor surface, a system of this type greatly facilitates cleaning of the floor area, because there are no obstructions on the floor itself. Further, the entire feed line and hopper may be raised as a unit upon its suspension members to increase the distance between the feeder unit and the floor, so that persons cleaning the area may more freely move and work beneath the hanging feeder unit. This freedom has been considerably restricted in the past, however, due to the fact that the supply hopper for a given feeder unit extends vertically upward from the trough or feed line. Consequently, when the feeder unit is raised vertically the top of the hopper limits the extent to which the trough may be raised. Thus, in the past it has not been possible in the great majority of instances to actually raise the trough an amount sufficient to permit clear access or room for a person to move beneath it. Instead, the suspended trough even while raised continued to present an obstacle which was not only bothersome but which also was a hindrance and an impediment to maximum efficiencies.

Accordingly, it is a major object of the present invention to provide an animal feeder construction having a feed trough which may be raised completely out of the way and substantially all the way to the ceiling of a poultry or animal house, if this be necessary. This is made possible by a novel arrangement wherein the feeder hopper is shiftably or movably coupled to the feed trough, such that the hopper may be shifted relative to the trough to move the hopper to a position beneath the trough. In such a position as this, there is no upwardly extending structure which can prevent the trough from being drawn upward the maximum possible amount, with the inverted hopper then depending downwardly from the elevated trough. Consequently, practically unlimited access is permitted beneath the raised feeder unit, such that one may freely walk and work therebeneath.

The foregoing major object of the invention and the many advantages provided thereby, together with other objects and advantages equally a part thereof, will become increasingly apparent following consideration of the ensuing specification and its appended claims, particularly when taken in conjunction with the accompanying illustrative drawings setting forth a preferred embodiment of the invention.

Briefly stated, the present invention provides an animal feeder construction having a novel arrangement wherein the feeder hopper is shiftably or movably coupled to the feed trough, such that the hopper may be shifted relative to the trough to move the hopper to a position beneath the trough. In such a position as this, there is no upwardly extending structure which can prevent the trough from being drawing upward the maximum possible amount, with the inverted hopper then depending downwardly from the elevated trough. Consequently, practically unlimited access is permitted beneath the raised feeder unit, such that one may freely walk and work thereneath.

Figure 1:
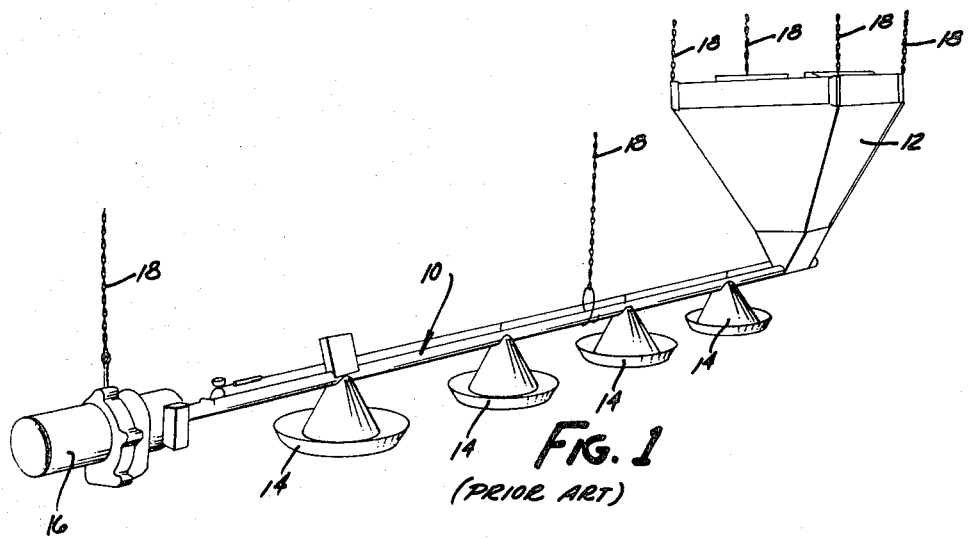
FIG. 1 is a fragmentary, lateral perspective view of a typical prior art animal feeder, showing the general type of construction with which the invention is concerned.
Figure 2:
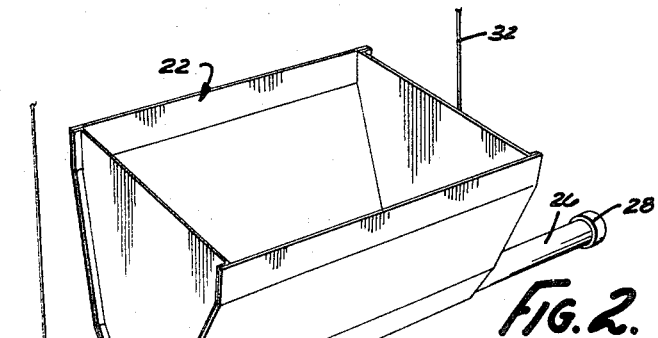
FIG. 2 is an enlarged, fragmentary lateral perspective view of the feeder construction of the invention.

Referring now in more detail to the drawings, the prior art feeder construction seen in FIG. 1 illustrates the general type of feeder to which the present invention relates. This type of feeder comprises a feed line or trough 10 which is connected to a feed supply hopper 12, such that feed from the hopper may travel downward into the trough 10 and be moved along the length thereof by an internal conveying member, generally of the auger type. The feed trough 10 is shown provided with typical feed pans 14 from which the animals or poultry may take food. These are connected to the bottom of the trough and communicate with an aperture formed therein, such that feed moved throughout the trough by the conveyor means located therein may drop downward into the feed pans 14 and be eaten out of these pans by poultry or the like. The conveying mechanism within the feed trough 10 is driven by an appropriate device such as an electric motor 16 mounted at the end of the trough opposite the supply hopper 12. As illustrated, both the feed trough 10 and the supply hopper 12 are suspended from overhead by a plurality of tension members 18, which are typically cables or small chains. These are attached to both the feed trough 10 and the hopper 12, as at each corner of the latter, in order to support the hopper and hold it steady vertically.

As seen in FIGS. 2 through 5, the animal feeder construction of the present invention also utilizes an elongated feed trough, which is designated 20, and a feed storage hopper 22. The feed trough 20 is itself quite similar to the trough 10 shown in FIG. 1 and mentioned above, in that when used with an auger-type conveying means 24 (FIG. 4) the trough is preferably a long cylindrical tube-like member. Also, the feed supply hopper 22 of the invention is similar in some respects to the supply hopper 12 seen in FIG. 1, in that it is walled enclosure suitable for holding a desired quantity of bulk feed or the like. However, in accordance with the present invention it wil be noted that none of the tension members connects directy to the hopper 22. Instead, as will be seen, the tension members connect only to the feed trough 20, while the hopper 22 has its own special connection to the feed trough.

Figure 3:
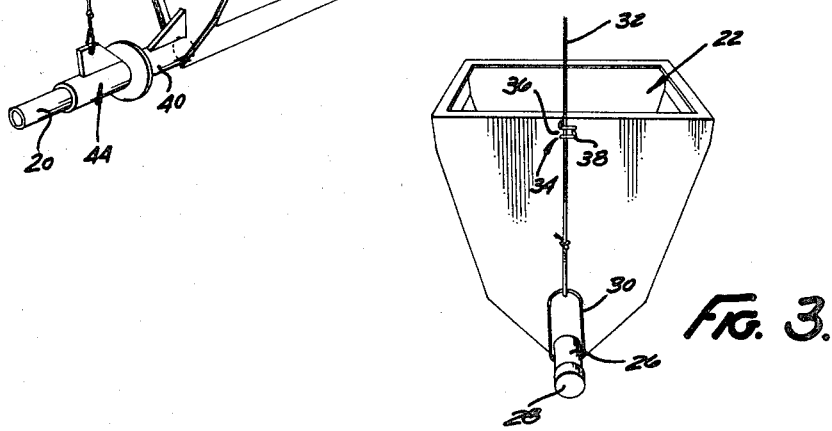
FIG. 3 is an end perspective view of the structure seen in FIG. 2.
Figure 4:
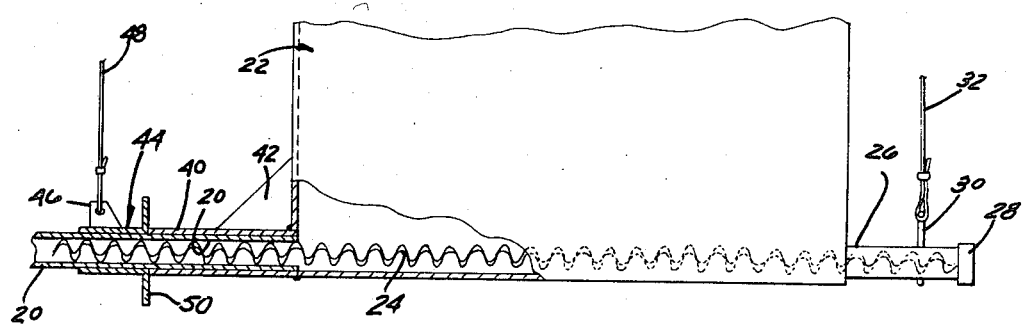
FIG. 4 is a fragmentary sectional side elevation of the structure of FIGS. 2 and 3, showing further details thereof.
Figure 5:
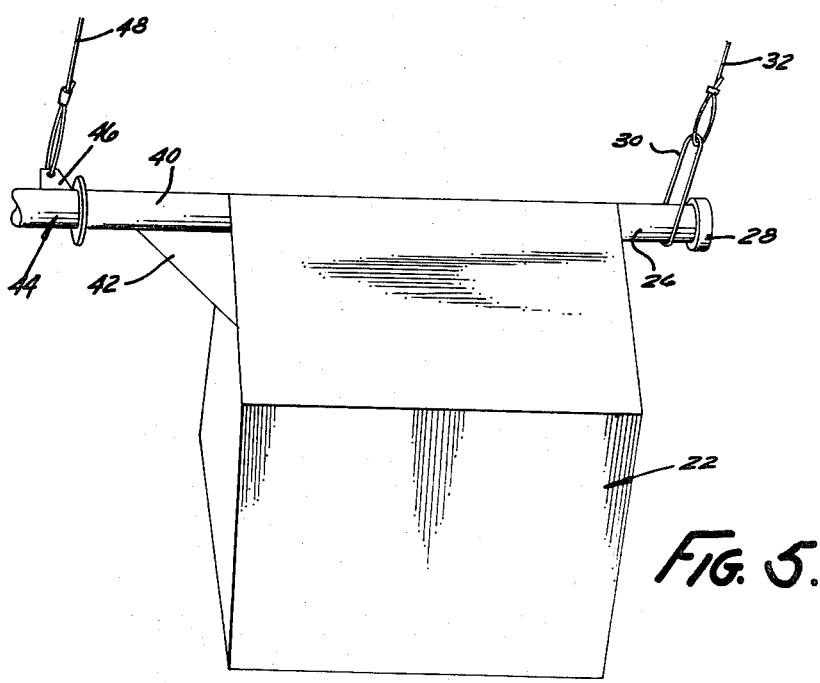
FIG. 5 is a fragmentary lateral perspective showing the structure of FIG. 2 with the hopper in a shifted or inverted position.

As best seen in FIG. 4, the hopper 22 of the invention has an opening near the bottom of its front and rear sides, through which the auger 24 passes, such that the auger extends completely through the bottom of the hopper. The hopper has a cylindrical extension element 26 extending from its rearward side, i.e., the side opposite that which the feed trough 20 extends into. The auger 24 passes a distance into the cylindrical extension 26, such that the auger actually extends completely through the bottom of the hopper 22. The outer end extremity of extension 26 is closed by a cap 28 which fits over it. This prevents the entry into the extension of dirt and other foreign matter from the outside, and the extension also serves to effectively retain an elongate bail or loop 30 in which the extension 26 rests, and to which a suspending tension member such as a cable 32 is connected, such that the loop will not slip off the end of the extension 26. As best seen in FIG. 3, a catch mechanism 34 is provided for engaging the tension member 32 at the rear of the hopper 22, to hold the hopper in an upright position relative to the feed trough 20. More specifically, the catch mechanism 34 preferably comprises a pair of oppositely-disposed J-shaped hooking fingers 36 and 38, each of which is attached at one end to the hopper 22, extends outwardly therefrom a brief distance, and then is bent to extend laterally a further brief distance. The two hooking fingers 36 and 38 are spaced vertically from each other, such that the cable 32 may easily be passed between them, either to place the tension member 32 in the "caught" or retained position which is illustrated, or to disengage the tension member from the hooking fingers, as when the hopper 22 is to be moved about the feed trough 20, in a manner to be set forth.

With reference once again to FIG. 4, it will be observed that the hopper 22 has a laterally-extending sleeve-like mounting element 40 secured to the bottom of the forward side thereof. Sleeve element 40 has an opening therethrough which communicates with the interior of the hopper 22, and which is of a size such that the tubular feed trough 20 may be placed inside the sleeve 40, where it extends toward the interior of the hopper. A triangular reinforcing rib 42 is secured between the forward face of the hopper and the top of the sleeve 40, and this stuctural arrangement allows the hopper 22 to be supported upon the feed trough 20. Sleeve element 40 provides in effect a rotatable coupling between the hopper 22 and the feed line or trough 20, since the sliding fit between the inside of the sleeve element and the outside of the trough 20 allows the entire hopper to be rotated about the feed trough when the rear tension member 32 is disengaged from the catch mechanism 34 in the manner previously described. During such rotation, the tension member 32 and the elongated loop 30 attached thereto continue to support the rear of the hopper, since when the latter is rotated about the feed through, the cylindrical extension 26 at the rear of the hopper merely rotates within the loop 30, with the cap 28 at the end of the extension preventing the loop from slipping off the end of the extension.

Immediately forward of the mounting sleeve 40 is located a suspension element 44. This element comprises an annular sleeve which slidably fits about or telescopes over the feed trough or line 20, so as to be positioned adjacent the end of the mounting sleeve 40. Suspension element 44 has an upstanding flange 46 to which another suspension cable or tension member 48 may be attached, as for example by looping the cable through an aperture in the flange 46 and then securing the loop with a conventional cable clamp. Thus, the suspension element 44 and the cable 48 attached thereto provide vertical support for the feed line 20 immediately forward of the hopper and, since the hopper is in effect mounted upon the feed trough by the cylindrical element 40 attached to and extending outwardly from the hopper, vertical support is also provided for the hopper itself. Since rotation of the hopper about the trough rotates the mounting sleeve 40 relative to the adjacent suspension element 44, a thrust washer 50 is provided between the sleeve 40 and the suspension element 44, with the thrust washer preferably being secured to or made integral with the suspension element. As will be understood, the face of thrust washer 50 adjacent the end of sleeve 40 provides a surface against which the end of the sleeve may turn during the aforesaid rotation.

Having now described the structural details and the assembly of the present animal feeder construction, and having also noted its general operation, the practical use of the device will likely already be appreciated. Those portions of the feed trough 20 extending forwardly of the hopper 22 are suspended by tension members which are the counterparts of cables 32 and 48, in the conventional manner illustrated in FIG. 1. Thus, the engagement of the rearward tension member 32 with the catch mechanism 34 at the rear side of the hopper 22 serves to hold the hopper upright relative to the trough and also to stabilize the hopper in this upright position during normal operation, which includes the placing of quantities of bulk feed within the hopper and the conveying of such feed by the auger 24 from the bottom of the hopper throughout the length of the feeder trough 20.

When it is desired to raise the feeder construction, as for cleaning the area or for other purposes, any quantity of feed which happens to remain within the hopper may be emptied into any convenient box or other such container by placing the latter directly beneath the hopper and disengaging the rearward tension member 32 from the catch mechanism 34, so that the hopper may be rotated 180 degrees about the axis of the feed trough, thereby dumping whatever feed remains within the hopper into the said box or other container located immediately therebelow. The entire feeder construction may then be raised in the conventional manner, by elevating the tension members 32, 48, and the like. With the hopper in its rotated position, it hangs downwardly from the feeder trough, and consequently the feeder trough may be raised the ultimate amount and well above the maximum amount which was previously possible.

Accordingly, the cleaning or other work may then be freely carried on beneath the highly elevated feed trough without the same presenting an obstacle as was previously the case. When the cleaning is completed, the feeder construction is lowered once again, the hopper is rotated about the feeder trough back to its upward position, and the rearward tension member 32 is once again engaged with the catch mechanism 34, to hold the hopper in the desired upright position.

It is entirely conceivable that upon examining the foregoing disclosure, those skilled in the art may devise embodiments of the concept involved which differ somewhat from the embodiment shown and described herein, or may make various changes in structural details to the present embodiment. Consequently, all such changed embodiments or variations in structure as utilize the concepts of the invention and clearly incorporate the spirit thereof are to be considered as within the scope of the claims appended herebelow, unless these claims by their langauge specifically state otherwise.

We claim:

1. An animal feeder construction, comprising in combination: a trough through which feed may be moved; a hopper for holding a desired quantity of feed and supplying the same to said trough; said hopper communicating at its bottom with said trough and having upper portions rising above the said trough; vertically oriented tension means; means for operatively coupling said tension means to said trough and said hopper for suspending the same from an overhead mounting and permitting raising and lowering of the trough and hopper between said mounting and a floor surface; and a shiftable coupling means between said hopper and said trough; said coupling means allowing said hopper to be shifted relative to the trough upon release of said tension means from said hopper to move said upper portions from above the trough to a position below the trough, such that said trough may be raised a maximum amount toward said overhead mount and upward from said floor.

2. The animal feeder construction of claim 1, wherein said tension means includes a plurality of tension members, said hopper includes a catch mechanism for engaging one of said tension members to stabilize and hold said hopper with respect thereto when said upper hopper portions are above said trough, said catch mechanism providing for disengagement of said tension member when said upper portions are to be moved below said trough.

3. The animal feeder construction of claim 1, wherein said shiftable coupling means comprises a rotatable coupling structure between said trough and said hopper.

4. The animal feeder construction of claim 3, wherein said tension means includes a plurality of tension members, said hopper includes a catch mechanism for engaging one of said tension members to stabilize and hold said hopper with respect thereto when said upper hopper portions are above said trough, said catch mechanism providing for disengagement of said tension member when said upper portions are to be moved below said trough.

5. The animal feeder construction of claim 4, wherein said catch mechanism comprises hooking fingers attached to said upper portions of said hopper.

6. The animal feeder construction of claim 3, wherein said rotatable coupling structure includes a sleeve element connected to the bottom of said hopper and extending laterally thereof, said sleeve element slidably receiving portions of said trough therewithin and being rotatable about such trough portions.

7. The animal feeder construction of claim 6, wherein said coupling structure further includes a suspension element having generally annular portions defining a passage for telescopingly receiving said trough; said element having structure for attaching at least portions of said tension means thereto, whereby said trough is vertically supported by such tension means.

8. The animal feeder construction of claim 7, wherein said sleeve element extends laterally outwardly of said hopper, and wherein said suspension element is located immediately adjacent the outward end extremities of said sleeve element.

9. The animal feeder construction of claim 8, wherein said tension means includes a plurality of tension members, said hopper includes a catch mechanism for engaging one of said tension members to stabilize and hold said hopper with respect thereto when said upper hopper portions are above said trough, said catch mechanism providing for disengagement of said tension member when said upper portions are to be moved below said trough.

10. The animal feeder construction of claim 9, wherein said catch mechanism comprises hooking fingers attached to said upper portions of said hopper.

References Cited

UNITED STATES PATENTS

| 3,033,163 | 5/1962 | Hostetler et al. | 119—52 |
| 3,134,478 | 5/1964 | Haen et al. | 119—52 X |

HUGH R. CHAMBLEE, *Primary Examiner.*

UNITED STATES PATENT OFFICE
CERTIFICATE OF CORRECTION

Patent No. 3,394,681                      July 30, 1968

Preston D. Rigterink et al.

It is certified that error appears in the above identified patent and that said Letters Patent are hereby corrected as shown below:

In the heading to the printed specification, lines 4 and 5, "assignors to Big Dutchman, Inc., Zeeland, Mich., a corporation of Michigan" should read -- assignors, by mesne assignments, to U. S. Industries, Inc., New York, N. Y., a corporation of Delaware --.

Signed and sealed this 30th day of December 1969.

(SEAL)
Attest:

Edward M. Fletcher, Jr.                        WILLIAM E. SCHUYLER, JR.
Attesting Officer                              Commissioner of Patents